US010897504B2

(12) United States Patent
Shao

(10) Patent No.: US 10,897,504 B2
(45) Date of Patent: *Jan. 19, 2021

(54) COMPUTERIZED SYSTEM FOR MANAGING GAS RESOURCE

(71) Applicant: CHENGDU QINCHUAN IOT TECHNOLOGY CO., LTD., Chengdu (CN)

(72) Inventor: Zehua Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 48 days.

This patent is subject to a terminal disclaimer.

(21) Appl. No.: 16/322,492

(22) PCT Filed: Nov. 4, 2016

(86) PCT No.: PCT/CN2016/104758
§ 371 (c)(1),
(2) Date: Feb. 1, 2019

(87) PCT Pub. No.: WO2018/028060
PCT Pub. Date: Feb. 15, 2018

(65) Prior Publication Data
US 2019/0273784 A1  Sep. 5, 2019

(30) Foreign Application Priority Data

Aug. 10, 2016 (CN) .......................... 2016 1 0651459

(51) Int. Cl.
G06F 15/173 (2006.01)
H04L 29/08 (2006.01)
(Continued)

(52) U.S. Cl.
CPC ............ *H04L 67/12* (2013.01); *H04L 67/141* (2013.01); *H04W 84/04* (2013.01); *H04W 84/18* (2013.01); *G06Q 50/06* (2013.01); *G06Q 50/26* (2013.01)

(58) Field of Classification Search
CPC ... H04L 67/12; H04L 67/141; H04L 67/2809; H04L 67/10; H04L 67/125; H04W 84/18; H04W 84/04; G06Q 50/26; G06Q 50/06
(Continued)

(56) References Cited

U.S. PATENT DOCUMENTS 9,485,231 B1 * 11/2016 Reese .................... H04L 63/02
2010/0174772 A1    7/2010 Beck
(Continued)

FOREIGN PATENT DOCUMENTS

CN   102360469 A   2/2012
CN   105279934 A   1/2016
(Continued)

*Primary Examiner* — Johnny B Aguiar
(74) *Attorney, Agent, or Firm* — Bayramoglu Law Offices LLC

(57) ABSTRACT

An Internet of Things (IoT) system, includes: a functional system, a physical system, and an information system. The functional system is a form for function expression; the information system is a way for function implementation; and the physical system is a carrier providing a physical support for the function implementation. The functional system has a five-platform structure, including: an object platform, a sensor network platform, a management platform, a service platform, and a user platform; the physical system and the information system also have five-part structures. Through the setting of these technical characteristics, an IoT system with clear system, definite functions, matching hardware, and clear information operation can be constructed.

17 Claims, 1 Drawing Sheet

(51) Int. Cl.
*H04W 84/18* (2009.01)
*H04W 84/04* (2009.01)
*G06Q 50/26* (2012.01)
*G06Q 50/06* (2012.01)

(58) Field of Classification Search
USPC .......................................... 709/220, 223, 224
See application file for complete search history.

(56) References Cited

U.S. PATENT DOCUMENTS

| | | | | |
|---|---|---|---|---|
| 2012/0154171 | A1* | 6/2012 | Hurri | H04Q 9/00 340/870.02 |
| 2015/0263886 | A1* | 9/2015 | Wang | H04L 41/08 370/254 |
| 2016/0330534 | A1* | 11/2016 | White, Jr. | H04Q 9/00 |
| 2018/0004930 | A1* | 1/2018 | Csinger | H04L 9/3234 |

FOREIGN PATENT DOCUMENTS

| | | | |
|---|---|---|---|
| CN | 105279935 A | 1/2016 |
| CN | 105279936 A | 1/2016 |
| CN | 105279937 A | 1/2016 |
| CN | 105303805 A | 2/2016 |
| CN | 105306589 A | 2/2016 |
| CN | 105306590 A | 2/2016 |
| CN | 105306592 A | 2/2016 |
| CN | 105306593 A | 2/2016 |
| CN | 105450745 A | 3/2016 |
| CN | 105467867 A | 4/2016 |
| CN | 105471970 A | 4/2016 |
| CN | 105743751 A | 7/2016 |

* cited by examiner

COMPUTERIZED SYSTEM FOR MANAGING GAS RESOURCE

CROSS REFERENCE TO THE RELATED APPLICATIONS

This application is the national phase entry of International Application No. PCT/CN2016/104758, filed on Nov. 4, 2016, which is based upon and claims priority to Chinese Patent Application No. 201610651459.7, filed on Aug. 10, 2016, the entire contents of which are incorporated herein by reference.

TECHNICAL FIELD

The present invention relates to an Internet of Things (IoT) system architecture, and specifically, the present invention mainly relates to an Internet of Things (IoT) system including a functional system, a physical system, and an information system.

BACKGROUND

The Internet of Things (IoT) is predicted to be another technology and economic wave in the global information industry following the Internet. Internet of Things has drawn the attention of the governments, enterprises and academic communities all over the world, and is even included in national and regional informatization strategies by the United States, the European Union and Japan.

With the development of science and technology, foreign scientific research institutions have carried out a great deal of research work in the field of Internet of Things, and the work focus has been gradually transferred from the early Industrial Internet of Things applications to the general platform of the Internet of Things. The core of the research work is, centering on the construction of the general platform, the European Union. The United States, Japan and South Korea have carried out research on the aspects of system architecture, access gateway, object naming analysis, and sensing technology, etc., and proposed technical solutions such as IoT architecture reference model, M2M gateway, and object coding methods, and sensing methods of sensor networks, etc.

Through the analysis of the research status of the main IoT architectures at home and abroad, it can be found that the research of the research organizations and of researchers around the world on the IoT architectures mainly has the following problems:

1. Most research is focused on a part of the Internet of Things. For example, some research is mainly focused on the communication function, while some of the research is mainly focused on the sensing function, etc., without a complete, comprehensive and clear description and explanation of the IoT system.

2. The existing research on the overall IoT architecture is mainly focused on the physical structure of the Internet of Things. The relationship among functions, information and physical structures is not clearly stated; and the conditions necessary for the operation of the IoT system are not fully illustrated. Therefore, the existing research on the overall architecture of the Internet of Things has many deficiencies.

In summary, the current research on the IoT, in essence of the object has not been considered, and an IoT system architecture with clear functions, physical structure and unimpeded information flow has not been formed.

SUMMARY

One of the objectives of the present invention is to provide an Internet of Things (IoT) system in view of the above-mentioned deficiencies, so as to solve the problem that there is no overall description of the IoT system architecture in the prior art, and simultaneously solve the problem of unclear relationship among functions, information and physical structures of the IoT system in the prior art.

The present invention is implemented as follows.

An Internet of Things (IoT) system, includes:

a functional system, a physical system, and an information system.

The functional system is a form of function expression; the information system is a way of function implementation; and the physical system is a carrier providing a physical support for the function implementation.

The functional system has a five-platform structure, including: an object platform, a sensor network platform, a management platform, a service platform, and a user platform; the physical system has a five-layer structure, including: an object layer, a sensor network layer, a management layer, a service layer, and a user layer; and the information system has a five-domain structure, including: an object domain, a sensing domain, a management domain, a service domain, and a user domain.

The function of each platform in the functional system is implemented through the support of physical entities in the corresponding physical system and the operation of information in the corresponding information system.

The object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

The five platforms of the functional system are discussed in detail below.

The function of the object platform in the functional system is to implement the sensing and control. A sensor unit of a sensor device senses sensory information and realizes the sensing function; through the sensor network platform, the management platform and the service platform, the sensory information is transmitted to a user through the operation of the IoT system; the user converts the sensory information to control information; the control information is transmitted to a control device of the target platform via the service platform, the management platform, and the sensor network platform; and the control is performed by a control unit of the control device, thereby forming a closed-loop information structure.

The sensor device and the control device may be a single device that performs sensing and control together, or may be two different devices that respectively perform sensing and control.

The function of the sensor network platform in the functional system is to implement the mutual communication between the object platform and the management platform. The sensor network platform is a platform for information communication, which plays a role in connecting the object platform and a local management platform or a remote management platform with a communication function.

The management platform in the functional system processes, stores, classifies, identifies and analyzes the information in the IoT system, thereby achieving the management functions, and providing support services for the service system. The management platform is an integrated management platform of the whole IoT system.

The management platform corresponds to the management domain in the information structure; and the management domain mainly includes an operator integrated management system, which is divided into a sensory information management system and a control information management system. An operator management server corresponding to the management platform in the physical structure and various facilities connected to the server are the carriers of the sensory information management system and the control information management system in the information structure.

The service platform in the functional system is a platform to provide services to users and realizes service functions, including a public government service platform, a public social network service platform, and an operator service platform; and the service items thereof include public services and operator services.

The IoT service platform corresponds to the service domain in the information structure; and the service domain includes an operator sensory service system, an operator control service system, a public sensory service system, and a government sensory service system. The IoT service platform corresponds to three parts of content in the physical structure, the first is an operator service platform server, the second is a public social network server, and the third is a government server.

The function of the user platform in the functional system is a platform for users to enjoy the service of the IoT system. The users use various user terminals to realize the output of their own needs and enjoy the service of the whole IoT system through human-computer interaction. The user platform is a platform for the users to issue the control information; and the users realize the output of their own needs mainly by issuing the control information.

The physical system and the information system are separately discussed below.

The physical system includes an object layer, a sensor network layer, a management layer, a service layer, and a user layer. Through the mutual connections of the various physical layers, a complete physical architecture of the Internet of Things is formed, which supports the complete operation of the information of the Internet of Things, and finally realizes the function of the Internet of Things.

The object layer is a layer where a carrying entity carrying all object information in the IoT is located, and includes the sensor unit of the sensor device and the control unit of the control device, possessing a sensing function and a control function. The sensor device and the control device may be a single device that performs sensing and control together, or may be two different devices that respectively perform sensing and control.

The sensor network layer includes a communication module of the sensor device and a communication module of the control device, an IoT intelligent gateway, a public network, and an operator communication server. Through the communication module of the sensor device, the communication module of the control device, and a sensor network composed of the IoT intelligent gateway, the public network and the operator communication server, the mutual communication between the sensor network layer and the operator management server can be realized.

The core of the management layer is the server, including the operator management server and other related facilities.

The service layer includes the government server, the public social network server, and the operator service platform server.

The user layer is a facility that provides physical support for the functions of the user platform, mainly including various terminal facilities, such as mobile communication terminals, special purpose terminals, internet terminals, and/or wireless local area network terminals.

The function of the information system in the present invention is to achieve the operation of information in the IoT system.

The information in the object domain includes the sensing information and the control information; and the sensing information is derived from an information source, and the control information is issued after passing through the IoT system.

The sensing domain is a collection of various communication information in the Internet of Things, including sensing communication information and control communication information. The sensing communication information is information for communicating the sensing information uploaded by the object domain; and the control communication information is information for communicating the control information issued after passing through the IoT system.

The management domain is an operator integrated management system in the Internet of Things, including a sensory information management system and a control information management system; and the management domain is an information guarantee for the orderly operation of the Internet of Things.

The service domain is a collection of various service information in the Internet of Things, including the sensing service information and the control service information. The sensing service information is provided by the public sensory service system, the government sensory service system, and/or the operator sensory service system; and the control service information is provided by the operator control service system.

The user domain includes a variety of relevant user information,

Moreover, the IoT system architecture of the present invention can realize the effectiveness, security, privacy, and openness of the information. In the IoT system, a complete closed-loop is formed through information operation to realize the effectiveness of sensing and control. Security refers to the security of all links in the process of information operation, including the security of the information, the security of the information operation process, and the security of the information exchange nodes. In the whole IoT system, the source of the sensory information in the object platform, the issue of the control information in the user platform, the information, and the operation of information between different platforms can ensure the security of information. The privacy of information refers to the realization of private communication between operators and users through the establishment of private channels in the service platform to ensure the privacy of information. In addition, in the IoT system, the Internet of Things exchanges and shares information with the public government service platform and the public social network service platform to realize the openness of information.

Compared with the prior art, one of the beneficial effects of the present invention is as follows. The IoT system is described in detail, and the IoT system is described exactly with what functions the IoT should achieved and how to achieve these functions in terms of the three dimensions of functional system, physical system and information system. Through the setting of these technical characteristics, an IoT system with clear system, definite functions, matching hardware, and clear information operation can be constructed, and the IoT system has a wide range of applications.

DETAILED DESCRIPTION OF THE EMBODIMENTS

The present invention will be further described below with reference to the drawings.

Figure 1:
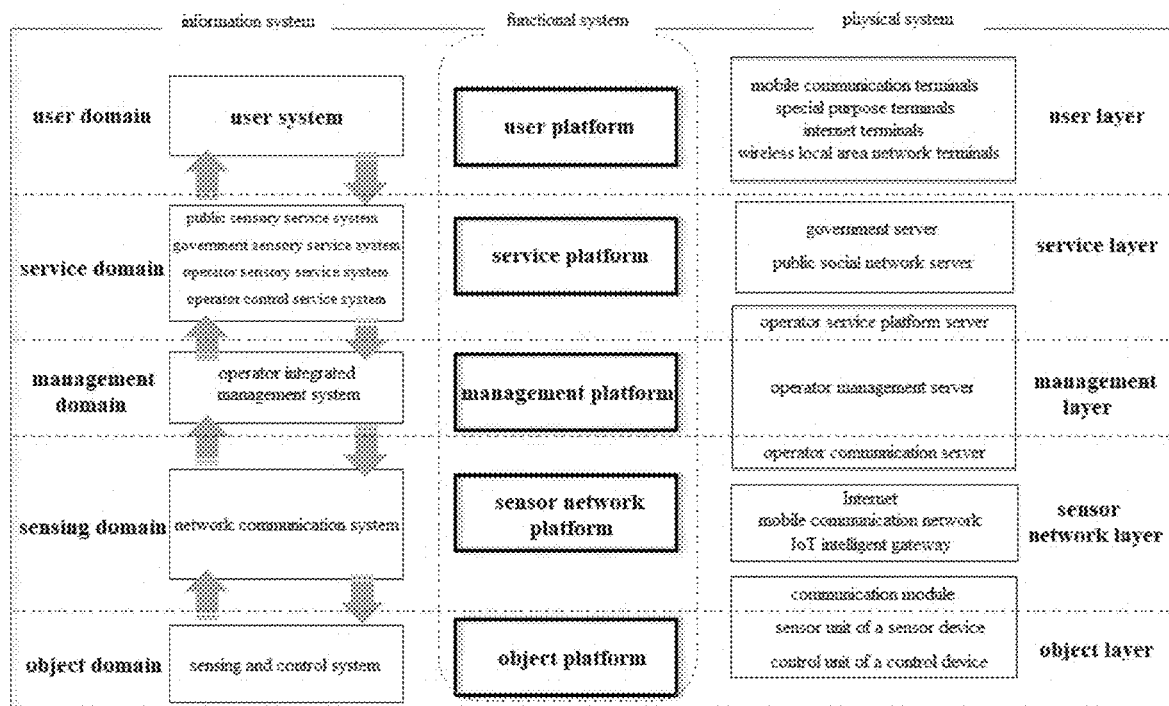
FIG. 1 is a structural diagram of an IoT system of the present invention.

As shown in FIG. 1, an Internet of Things (IoT) system, includes:

a functional system, a physical system, and an information system.

The functional system is a form for function expression; the information system is a way for function implementation; and the physical system is a carrier providing a physical support for the function implementation.

The functional system has a five-platform structure, including: an object platform, a sensor network platform, a management platform, a service platform, and a user platform; the physical system has a five-layer structure, including: an object layer, a sensor network layer, a management layer, a service layer, and a user layer; and the information system has a five-domain structure, including: an object domain, a sensing domain, a management domain, a service domain, and a user domain.

The function of each platform in the functional system is implemented through the support of physical entities in the corresponding physical system and the operation of information in the corresponding information system.

The object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

The function of the object platform is to implement the sensing and control. A sensor unit of a sensor device senses sensory information and realizes the sensing function; through the sensor network platform, the management platform and the service platform, the sensory information is transmitted to a user through the operation of the IoT system; the user converts the sensory information to control information; the control information is transmitted to a control device of the object platform via the service platform, the management platform, and the sensor network platform; and the control is performed by a control unit of the control device, thereby forming a closed-loop information structure.

The sensor device and the control device may be a single device that performs sensing and control together, or may be two different devices that respectively perform sensing and control.

The function of the sensor network platform is to implement the mutual communication between the object platform and the management platform.

The management platform processes, stores, classifies, identifies and analyzes the information in the IoT system, thereby implementing the management functions, and providing support services for the service system. The management platform is an integrated management platform of the whole IoT system.

The management platform corresponds to the management domain in the information structure; and the management domain mainly includes an operator integrated management system, which is divided into a sensory information management system and a control information management system. An operator management server of the physical structure corresponding to the management platform and various facilities connected to the server are the carriers of the sensory information management system and the control information management system in the information structure.

The service platform is a platform to provide services to users and implement service functions, including a public government service platform, a public social network service platform, and an operator service platform; and the service items thereof include public services and operator services.

The IoT service platform corresponds to the service domain in the information structure; and the service domain includes an operator sensory service system, an operator control service system, a public sensory service system, and a government sensory service system. The IoT service platform corresponds to three parts in the physical structure, the first is an operator service platform server, the second is a public social network server, and the third is a government server.

The function of the user platform is a platform for users to enjoy the service of the IoT system. The users use various user terminals to realize the output of their own needs and enjoy the service of the whole IoT system through human-computer interaction.

The physical system includes an object layer, a sensor network layer, a management layer, a service layer, and a user layer. Through the mutual connection between various physical layers, a complete physical architecture of the Internet of Things is formed, which supports the complete operation of the information of the Internet of Things, and finally realizes the function of the Internet of Things.

The object layer is a layer where carrying entities carrying all object information in the IoT are located, including the sensor unit of the sensor device and the control unit of the control device, and possessing a sensing function and a control function. The sensor device and the control device may be a single device that performs sensing and control together, or may be two different devices that respectively perform sensing and control.

The sensor network layer includes a communication module of the sensor device, a communication module of the control device, an IoT intelligent gateway, a public network, and an operator communication server. Through the communication module of the sensor device, the communication module of the control device, and a sensor network composed of the IoT intelligent gateway, the public network and the operator communication server, the sensor network layer can realize the mutual communication with the operator management server.

The core of the management layer is the server, including the operator management server and other related facilities.

The service layer includes the government server, the public social network server, and the operator service platform server.

The user layer is a facility that provides physical support for the functions of the user platform, mainly including various terminal units, such as mobile communication terminals, special purpose terminals, Internet terminals, or wireless local area network terminals.

The function of the information system is to implement the operation of information in the IoT system.

The information in the object domain includes the sensing information and the control information; the sensing information is derived from an information source, and the control information is information issued after passing through the IoT system.

The sensing domain is a collection of all communication information in the Internet of Things, including sensing communication information and control communication information. The sensing communication information is information for communicating the sensing information uploaded by the object domain; and the control communication information is information for communicating the control information issued after passing through the IoT system.

The management domain is an operator integrated management system in the Internet of Things, including a sensory information management system and a control information management system; and the management domain is an information guarantee for the orderly operation of the Internet of Things.

The service domain is a collection of all service information in the Internet of Things, including the sensing service information and the control service information. The sensing service information is provided by the operator sensory service system, the public sensory service system, and/or the government sensory service system; and the control service information is provided by the operator control service system.

The user domain includes a variety of relevant user information.

The present invention will be further described below with a specific gas IoT system as an embodiment.

Figure 2:
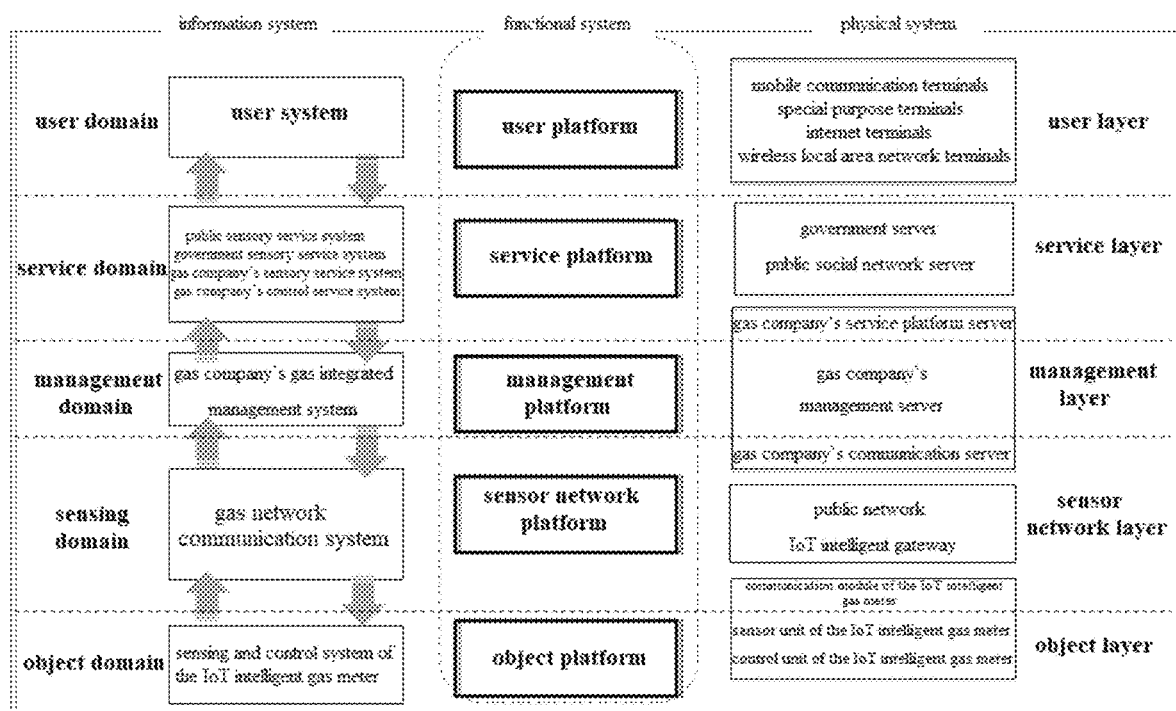
FIG. 2 is a structural diagram of an IoT system of one embodiment of the present invention.

As shown in FIG. 2, similar to the conventional IoT system, the gas IoT system also includes a functional system, a physical system and an information system. The functional system is a form for function expression; the information system is a way for function implementation; and the physical system is a carrier providing a physical support for the function implementation.

In the gas IoT system, the functional system has a five-platform structure, including: an object platform, a sensor network platform, a management platform, a service platform, and a user platform; the physical system has a five-layer structure, including: an object layer, a sensor network layer, a management layer, a service layer, and a user layer; and the information system has a five-domain structure, including: an object domain, a sensing domain, a management domain, a service domain, and a user domain.

The function of the object platform of the gas IoT system is to implement the sensing and control. A sensor unit of an IoT intelligent gas meter senses sensory information and realizes the sensing function; through the sensor network platform, the management platform and the service platform, the sensory information is transmitted to a user through the operation of the IoT system; and after the sensory information is converted into control information by the user, the control information is transmitted via the service platform, the management platform, and the sensor network platform to a control unit of the IoT intelligent gas meter in the object platform to perform the control, thereby forming a closed-loop information structure.

The function of the sensor network platform is to implement the mutual communication between the object platform and the management platform.

The management platform processes, stores, classifies, identifies and analyzes the information in the IoT system, thereby realizing the management functions, and providing support services for the service system. The management platform is an integrated management platform of the whole IoT system.

The management platform corresponds to the management domain in the information structure; and the management domain mainly includes a gas company's gas integrated management system, which is divided into a sensory information management system and a control information management system. A gas company's management server in the physical structure corresponding to the management platform and various facilities connected to the server are the carriers of the sensory information management system and the control information management system in the information structure.

The service platform is a platform to provide services for users and implement service functions, including a public government service platform, a public social network service platform, and a gas company's service platform; and the service items thereof include public services and gas company's services.

The IoT service platform corresponds to the service domain in the information structure; and the service domain includes a public sensory service system, a government sensory service system, a gas company's sensory service system, and a gas company's control service system. The IoT service platform corresponds to three parts in the physical structure, the first is a public social network server, the second is a government server, and the third is a gas company's service platform server.

The function of the user platform is a platform for users to enjoy the service of the IoT system. The users use various user terminals to realize the output of their own needs and enjoy the service of the whole IoT system through human-computer interaction.

The physical system includes an object layer, a sensor network layer, a management layer, a service layer, and a user layer. Through the mutual connection between various physical layers, a complete physical architecture of the Internet of Things is formed, which supports the complete operation of the information of the Internet of Things, and finally realizes the function of the Internet of Things.

The object layer is a layer where a carrying entity carrying all object information in the IoT is located, including the sensor unit of the IoT intelligent gas meter and the control unit of the IoT intelligent gas meter, and possessing a sensing function and a control function.

The sensor network layer includes a communication module of the IoT intelligent gas meter, an IoT intelligent gateway, a public network, and a gas company's communication server. Through the communication module of the IoT intelligent gas meter, and a sensor network composed of the IoT intelligent gateway, the public network and the gas company's communication server, the sensor network layer can realize the mutual communication with the gas company's management server.

The core of the management layer is the server, including the gas company's management server and other related facilities.

The service layer includes the government server, the public social network server, and the gas company's service platform server.

The user layer is a facility that provides physical support for the functions of the user platform, mainly including various terminal units, such as mobile communication terminals, special purpose terminals, Internet terminals, or wireless local area network terminals.

The function of the information system is to implement the operation of information in the IoT system.

The information in the object domain includes the sensing information and the control information; the sensing information is derived from an information source, and the control information is information issued after passing through the IoT system.

The sensing domain is a collection of all communication information in the Internet of Things, including sensing communication information and control communication information. The sensing communication information is information for communicating the sensing information uploaded by the object domain; and the control communication information is information for communicating the control information issued after passing through the IoT system.

The management domain is a gas company's integrated management system in the Internet of Things, including a sensory information management system and a control information management system; and the management domain is an information guarantee for the orderly operation of the Internet of Things.

The service domain is a collection of all service information in the Internet of Things, including the sensing service information and the control service information. The sensing service information is provided by the public sensory service system, and/or the government sensory service system, and/or the gas company's sensory service system; and the control service information is provided by the gas company's control service system.

The user domain includes a variety of relevant user information.

The gas IoT system of the present invention will be described in detail below with a specific application example in the gas IoT system as an embodiment.

In the gas IoT system, when the remaining volume of pre-stored gas of a meter terminal of the IoT intelligent gas meter is insufficient, in the object platform, the sensor unit of the IoT intelligent gas meter will obtain the information that the gas remaining volume is insufficient, i.e., the sensing information; using the IoT intelligent gateway, mobile communication network, and Internet of the gas IoT sensor network layer, the sensing information is transmitted to the gas company's management platform through the communication module of the IoT intelligent gas meter; after identifying and analyzing the sensing information, the gas company's management platform transmits the information of insufficient gas volume to the user platform through the service platform; after receiving the information of insufficient gas volume, the user makes a judgment of needing recharge, and transmits a recharge instruction and a recharge amount to the gas company's management platform through the service platform; the gas company's management platform uses the sensor network platform to send the recharge instruction to the IoT intelligent gas meter according to the user's recharge instruction and the recharge volume; and the control unit of the IoT intelligent gas meter of the object platform accumulates the pre-purchased gas volumes of the IoT intelligent gas meter to complete the remote recharge. Therefore, the whole operation of the sensing information and control information in the gas IoT system is completed, and the function of the gas IoT system is realized.

This example fully illustrates the IoT system architecture of the present invention, clearly reflects the functional expression form of the IoT functional system, as well as the effects of the information system and the physical system in the functional realization process.

In addition to the foregoing descriptions, it should be noted that "one embodiment", "another embodiment", "an embodiment", etc., mentioned in the specification indicate that the specific features, structures or characteristics described in combination with the embodiment are included in at least one embodiment of the general description of the present application. The same expression in several parts of the specification does not necessarily refer to the same embodiment. Further, when specific features, structures, or characteristics are described in combination with any embodiment, it is asserted that the realizations of such features, structures, or characteristics in combination with other embodiments also fall within the scope of the present invention.

Although the present invention has been described herein with reference to the explanatory embodiments of the present invention, it should be understood that various modifications and other embodiments can be devised by those skilled in the art, and those modifications and embodiments will fall within the disclosed principle scope and spirit of the present application. More specifically, various variations and modifications can be made to the component parts and/or arrangement of the subject combination arrangement within the scope of the disclosure, the drawings and the claims of the present application. In addition to the variations and modifications to the component parts and/or arrangements, other uses of the present invention will also be apparent to those skilled in the art.

What is claimed is:

1. A computerized system for managing a gas resource, comprising:
   a functional system, a physical system, and an information system that define an internet of things system; wherein
   the functional system is a form for a function expression; the information system is a way for a function implementation; and the physical system is a carrier providing a physical support for the function implementation;
   the functional system has a five-platform structure, comprising an object platform, a sensor network platform, a management platform, a service platform, and a user platform;
   the physical system has a five-layer structure, comprising an object layer, a sensor network layer, a management layer, a service layer, and a user layer;

the information system has a five-domain structure, comprising an object domain, a sensing domain, a management domain, a service domain, and a user domain, wherein
  the management domain is an integrated management system of a gas company comprising a sensory information management system and a control information management system, and
  the service domain is a collection of service information in the internet of things system, and the service information comprises sensing service information and control service information, the sensing service information being provided by a public sensory service system, a government sensory service system and a sensory service system of the gas company;
a function of each platform in the functional system is implemented through supports of physical entities in the physical system and an operation of information in the information system; and
the object platform of the functional system corresponds to the object layer in the physical system and the object domain in the information system;
the sensor network platform of the functional system corresponds to the sensor network layer in the physical system and the sensing domain in the information system; the management platform of the functional system corresponds to the management layer in the physical system and the management domain in the information system;
the service platform of the functional system corresponds to the service layer in the physical system and the service domain in the information system; and
the user platform of the functional system corresponds to the user layer in the physical system and the user domain in the information system, wherein
a function of the object platform is to implement sensing and control; a sensor unit of a sensor device senses sensory information and realizes a sensing function; through the sensor network platform, the management platform and the service platform, the sensory information is transmitted to a user through an operation of the internet of things system; after the sensory information is converted into control information by the user, the control information is transmitted via the service platform, the management platform, and the sensor network platform to a control device of the object platform; and the control is performed by a control unit of the control device, thereby forming a closed-loop information structure.

2. The computerized system according to claim 1, wherein
a function of the sensor network platform is to implement a mutual communication between the object platform and the management platform.

3. The computerized system according to claim 1, wherein
the management platform processes, stores, classifies, identifies and analyzes information in the internet of things system, thereby implementing management functions, and providing support services for a service system; the management platform is an integrated management platform of the internet of things system; and
the management domain comprises an operator integrated management system, containing the sensory information management system and the control information management system; and an operator management server in the physical system corresponding to the management platform and a plurality of facilities connected to the operator management server are carriers of the sensory information management system and the control information management system in the information system.

4. The computerized system according to claim 1, wherein
the service platform is a platform to provide services for users and implement service functions, including a public government service platform,
and the service platform corresponds to three parts in the physical system, the three parts include an operator service platform server, a public social network server, and a government server.

5. The computerized system according to claim 1, wherein
a function of the user platform is for users to enjoy a service of the internet of things system; the users use various user terminals to realize needed outputs and enjoy the service of the internet of things system through human-computer interaction.

6. The computerized system according to claim 1, wherein
through mutual connections between various physical layers of the physical system, a complete physical architecture of an internet of things is formed, thereby supporting a complete operation of information of the internet of things, and finally realizing a function of the internet of things.

7. The computerized system according to claim 6, wherein
the object layer is a layer where a carrying entity carrying all object information in the internet of things is located, comprising the sensor unit of the sensor device and the control unit of the control device, possessing the sensing function and a control function.

8. The computerized system according to claim 6, wherein
the sensor network layer comprises a communication module of the sensor device and a communication module of the control device, an internet of things intelligent gateway, a public network, and an operator communication server; and through the communication module of the sensor device, the communication module of the control device, and a sensor network composed of the internet of things intelligent gateway, the public network and the operator communication server, the sensor network layer realizes a mutual communication with an operator management server.

9. The computerized system according to claim 6, wherein
a core of the management layer is servers, comprising an operator management server and other related facilities.

10. The computerized system according to claim 6, wherein
the service layer comprises a government server, a public social network server, and an operator service platform server.

11. The computerized system according to claim 6, wherein
the user layer is a facility providing a physical support for functions of the user platform, comprising a plurality of terminal units including mobile communication terminals, special purpose terminals, internet terminals, and/or wireless local area network terminals.

12. The computerized system according to claim 1, wherein
a function of the information system is to implement an operation of information in the internet of things system.

13. The computerized system according to claim 12, wherein
information in the object domain comprises sensing information and control information; the sensing information is derived from an information source, and the control information is issued after passing through the internet of things system.

14. The computerized system according to claim 12, wherein
the sensing domain is a collection of a plurality of communication information in an internet of things, comprising sensing communication information and control communication information; wherein the sensing communication information is information for communicating sensing information uploaded by the object domain; and the control communication information is information for communicating control information issued after passing through the internet of things system.

15. The computerized system according to claim 12, wherein
the management domain is an information guarantee for an orderly operation of an internet of things.

16. The computerized system according to claim 12, wherein
the user domain comprises a variety of relevant user information.

17. The computerized system according to claim 1, wherein
the internet of things system realizes effectiveness, security, privacy, and openness of information; in the internet of things system, a complete closed-loop is formed through information operation to realize effectiveness of sensing and effectiveness of control; the security refers to the security of all links in an information operation process, comprising the security of the information, the security of the information operation process, and the security of information exchange nodes; in the internet of things system, sources of sensory information in the object platform, issues of control information in the user platform, the information, and an operation of the information between different platforms can ensure the security of the information; the privacy of the information refers to a realization of private communication between operators and users through establishment of private channels in the service platform to ensure the privacy of the information; and in the internet of things system, an internet of things exchanges and shares information with a public government service platform and a public social network service platform to realize the openness of the information.

* * * * *